Aug. 11, 1953         W. S. BAER, SR         2,648,310
LINK-PLATE SEAL FOR CATAPULT SLOTTED CYLINDERS
Filed June 23, 1952                    2 Sheets-Sheet 1
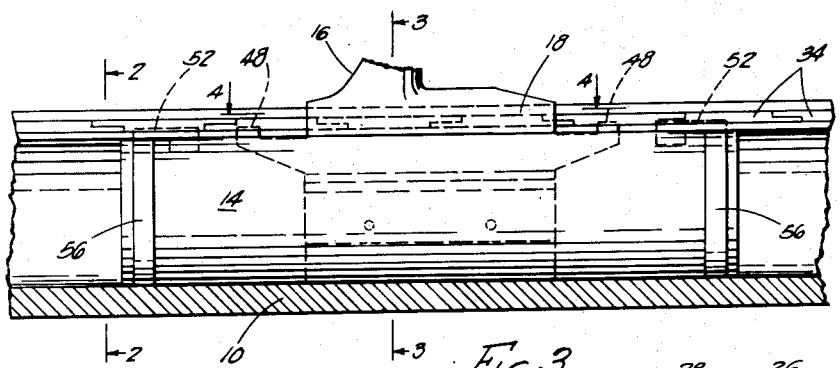
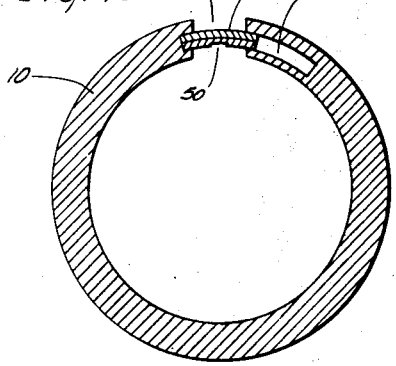
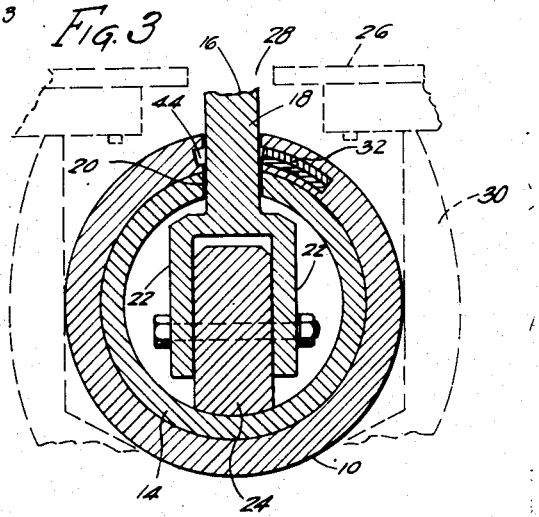
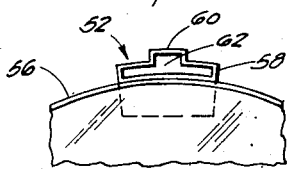
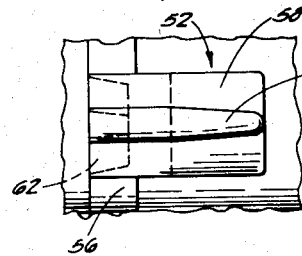
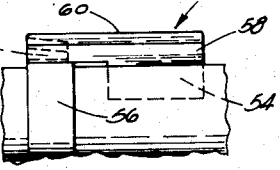
INVENTOR.
WALTER S. BAER, SR.
BY
ATTORNEYS Aug. 11, 1953     W. S. BAER, SR     2,648,310
LINK-PLATE SEAL FOR CATAPULT SLOTTED CYLINDERS
Filed June 23, 1952     2 Sheets—Sheet 2
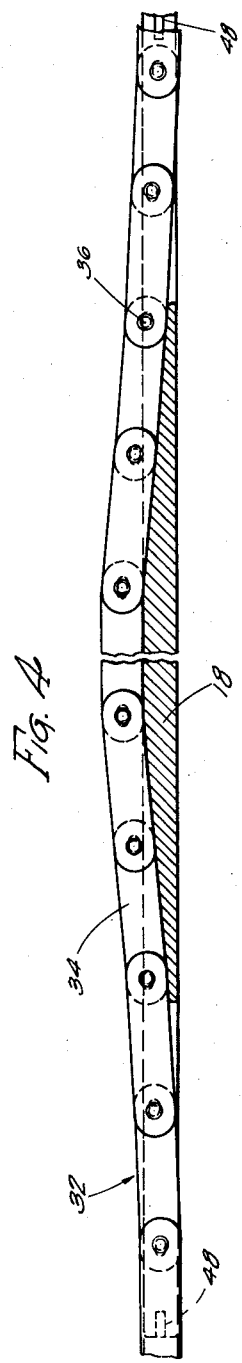
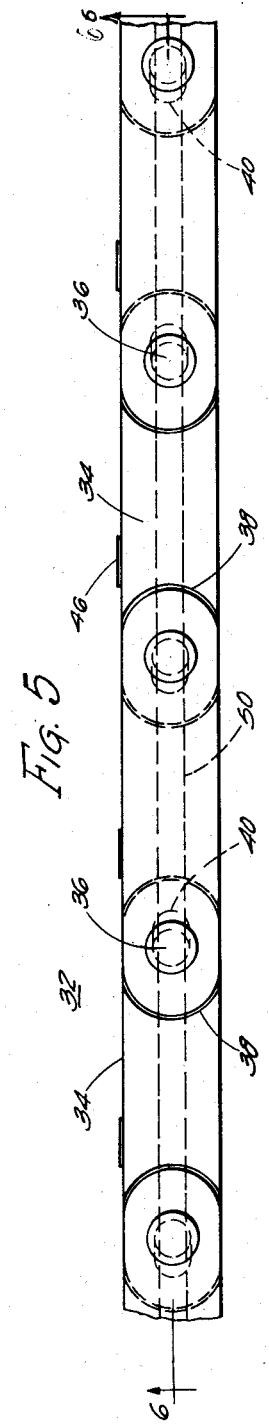
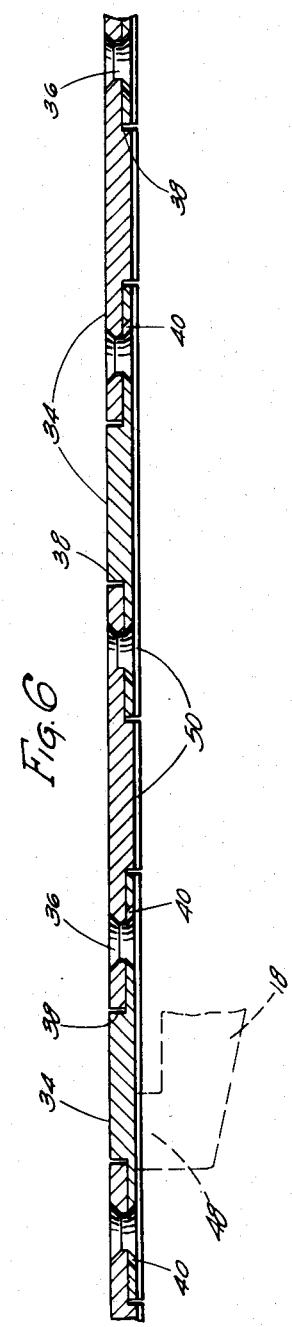
INVENTOR.
WALTER S. BAER, SR.
BY F.J. Schmitt
H.H. Carriger
ATTORNEYS Patented Aug. 11, 1953

2,648,310

UNITED STATES PATENT OFFICE 2,648,310

LINK-PLATE SEAL FOR CATAPULT SLOTTED CYLINDERS

Walter S. Baer, Sr., Yeadon, Pa.

Application June 23, 1952, Serial No. 295,135

7 Claims. (Cl. 121—1)

(Granted under Title 35, U. S. Code (1952), sec. 266)

The invention described herein may be manufactured and used by or for the Government of the United States of America for governmental purposes without the payment of any royalties thereon or therefor.

This invention relates to propelling devices and particularly to catapult devices for launching aircraft or other objects into space.

For launching devices of this general character it has been the practice to provide a slotted tube or cylinder in which moves a fluid actuated piston. The piston is provided with an arm or fin extending through the slot of the cylinder for connection to an external object to be propelled. Heretofore, considerable difficulty has been encountered in providing an effective seal for the slot. In one type of launching device, a long solid and relatively cumbersome metallic strip has been employed which was required to be shifted and whipped into closing position by the fast moving piston. Usually the strip was located inside of the cylinder where it was relatively inaccessible for cooling after being subjected to the ignited gas employed to propel the piston and the object to be launched. Because of its solid and extensive length, such a sealing strip was relatively heavy for quick shifting movement and imposed a considerable resistance to the movement of the piston as well as increased the possibility of frictional wear of parts.

An important object of the present invention is to provide an improved propelling or launching device and particularly an improved sealing means for closing the slotted opening which overcomes the disadvantages inherent in the earlier forms of such devices.

Another important object of the invention is to provide an improved sealing member or strip for closing a slotted opening which requires less effort to operate than heretofore, is more accessible for cooling, and provides an effective seal for the slot on either side of the piston.

A further important object of the invention is to provide an improved seal for a slotted opening which is in the form of a chain of link members so connected together that they may be easily displaced by the passage of the arm or fin and returned to slot closing position.

A still further important object of the invention is to provide a novel operative connection between the piston and the chain of sealing members which acts to quickly return the members to slot closing position immediately behind the moving fin when traveling in either direction.

Other objects and many of the attendant advantages of this invention will be readily appreciated as the same becomes better understood by reference to the following detailed description when considered in connection with the accompanying drawings wherein:

Fig. 1 is a longitudinal sectional view through a launching cylinder showing a piston mounted therein having an arm for operating connection with an object to be propelled;

Fig. 2 is a cross sectional view taken through line 2—2 of Fig. 1 and showing the link plates in slot closing position.

Fig. 3 is a cross sectional view taken along line 3—3 of Fig. 1 and showing the link plates in laterally displaced position.

Fig. 4 is a longitudinal sectional view taken along line 4—4 of Fig. 1.

Fig. 5 is a top place view of several of the connected link plates.

Fig. 6 is a longitudinal sectional view taken along line 6—6 of Fig. 5, and

Figs. 7, 8 and 9 are end, top and side views of one of the end seals carried by the piston for assuring retention of link plates in slot closing position.

The invention provides a quick acting and continuous seal for the slot of an aircraft launching or catapulting device but is also adapted for the closing of any similar slot-like opening. In such launching devices, an elongated tube or cylinder is provided with a longitudinal slot usually running substantially the full length of the cylinder. The actuating member of the device is a piston which is urged through the cylinder at high speeds. Usually, fluid pressure created by the ignition of a combustible gas is the propelling medium. The piston is provided with an arm or fin extending through the slot for operative connection with the object to be launched or propelled.

Referring particularly to the drawings, the cylinder of an aircraft launching or catapulting device is indicated at 10. Its longitudinal slot is indicated at 12. Slidably received in the cylinder is a piston 14. The operating connection between the piston and the object to be propelled is indicated at 16. It is in the form of an arm or fin having a narrow elongated base 18 which is of size to permit it to ride in the slot 12. Preferably, as shown in Fig. 4, the portion of the base 18 lying within the slot 12 tapers in opposite directions from a maximum thickness at its opposite ends.

The arm or fin 16 is connected to the piston 14 in any suitable manner. As illustrated the base 18 of the fin may be arranged as shown to enter a narrow opening 20 in the wall of the piston and then be divided to form bifurcated sections 22—22 which are straddlingly connected to central rib 24 of the piston. The whole assembly of the slotted cylinder and piston are usually located below the level of a deck having an elongated opening through which the fin extends. Shown in dotted outline in Fig. 3 is a deck 26 having an opening 28 co-extensively aligned with the cylinder slot 12. Suitable supporting structure indicated in dotted outline at 30 forms a housing for the cylinder and piston assembly below the deck.

The slot sealing means of the present invention is designed so that successive sections of its length may be displaced by the passage of the fin 16 along the slot. It is further designed so that it may cooperate with means carried by the piston to return to slot closing position immediately behind the moving fin.

The slot closing means is in the form of an elongated flexible element generally indicated at 32 and normally positioned in straddling relation to the slot to seal the same. The sealing element has a width slightly greater than that of the slot and a length approximately that of the slot. As illustrated herein, the sealing element is made up of a plurality of rectangularly shaped plate-like link members joined in end to end relation to form an elongated chain. Each link member is pivotally connected at its opposite ends to the adjacent members. In addition, the links are preferably so connected to one another that they have a limited linear play with respect to one another. The result is that the link members may be easily deflected in successive order by the moving fin thereby imposing very little resistance to its movement and that of the piston.

The individual link members of the sealing element are identified by the reference character 34. Each link member or plate exhibits a relatively flat rectangular configuration having rounded ends as shown in Figs. 5 and 6. The link plates are arranged in end overlapping relationship and pivotally connected together to form an elongated flexible chain of rigid links. The pivoted connection between each pair of adjacent links may be by countersunk headed rivets such as shown at 36. In order to provide the same thickness for the sealing element throughout its length, the overlapping ends of the link plates are reduced in thickness to approximately half their original thickness and arranged so that the reduced portions superimpose one another. The rounded ends of each link have a radius of curvature centering on the axis of the rivets. The shoulder 38 formed by each reduced end section and the balance of the link plate is preferably curved in complementary relation to the rounded overlapping end of the adjacent link plate as shown. Thus, each link plate may swing in pivotal relation to the adjacent plates and yet form a relatively tight fluid seal therewith.

In addition to pivotally moving relatively to one another, it is preferred to provide a linear adjustment of each link plate relative to the others. This may be accomplished by elongating the opening in one of the two overlapping end sections of each adjacent set of links through which the connecting rivet extends. As shown in Figs. 5 and 6, the hole in the under section of each overlapping set of end sections is elongated as shown at 40 in the longitudinal direction of the link plate. This provides a degree of linear play between each adjacent pair of link plates which is limited by the extent of the elongation of the hole. In the normal sealing straight-line position of the link plates which is shown in Fig. 5, the rivets 36 are disposed at the inner ends of the elongated openings 40. However, as the link plates are thrust aside by the fin 16, the rivets travel to the outer ends of the openings as shown by the progressively displaced positions of the plates in Fig. 4.

In the illustrated embodiment of the invention the link plates 34 are deflectable laterally to one side of the cylinder slot 12. Moreover, in the embodiment illustrated herein the cylinder is shown as accommodating the link plates between its inner and outer surface portions and the link plates are shown as being curved transversely to conform to the curvature of the cylinder. It is understood that other mounting arrangements for the link plates may be provided.

To permit the lateral displacement of the link plates as well as to form a guide for their movement, the cylinder 10 is recessed adjacent to the slot 12 to allow the shiftable movement of the sealing plates 34 from slot closing position shown in Fig. 2 to slot opened position shown in Fig. 3. This is accomplished by providing a relatively deep recess 42 in the wall of the slot facing the tapered side of the fin 16. The opposite wall of the slot is provided with a relatively shallow recess 44. The smaller or shallower recess 44 is just sufficient to receive one side marginal portion of the like members 34 to permit the same to straddle and close the slot 12 in the manner shown in Fig. 2. The deeper recess 42 is sufficient to wholly receive the link members and completely clear the slot 12 for the movement of the fin 16 therealong.

It is evident from the description thus far that as the fin 16 moves the length of the slot 12 it successively displaces the link plates to one side and into the deeper recess 42 of the cylinder wall. The tapered side of the fin acts as a wedge to pivot and shift each link plate to one side of the slot, the swinging and linearly adjustable feature of each link plate permitting it to slide easily and smoothly to one side. The tapered side engages one marginal edge of all the link members. Preferably this edge is retained in smooth unobstructed condition. The opposite marginal edge of the link plates may be provided with ridges 46 for abutting engagement with the base of the recess 42 to prevent undue wear.

A feature of the invention is the provision for returning the link members to slot closing position immediately behind the moving arm or fin 16. This is accomplished by means of a positive mechanical connection between the traveling piston and the link members. The connection acts in trailing relation to the moving fin and causes the link members to hug the tapered side of the fin as they shift into slot closing position. Moreover, the provision may be incorporated on the opposite ends of the piston so that regardless of the direction of movement of the piston it is effective to move the link members to slot sealing position.

The withdrawal of the link members to slot closing position is accomplished by means of a finger-like element carried by the piston in trailing relation to the fin and successively interengaging with the link members to draw or pull them into overlying relation to the cylinder slot. A finger for this purpose is shown at 48 in Fig. 1 both forwardly and rearwardly of the fin 16. Preferably these fingers are formed as projections on the base 18 of the fin although they may form a direct part of the piston, if desired. As a projection, each finger 48 rises into the slot 12 for engagement with the link members.

As illustrated herein, the finger-like elements 48 ride in aligned grooves formed in the bottom sides of the link plates. These grooves are indicated at 50 and are similarly formed in each link plate so that one continuous groove results. The groove of each link plate is relatively shallow as shown in Fig. 6 and has a width less than that of the slot as shown in Fig. 2. The upper extremity of each finger 48 enters the grooves 50 and rides therethrough as the piston moves. The result is that as the finger 48, operating in trailing relation to the fin, moves along with the piston it acts to draw the displaced link plates back to slot closing position. The pivotal and longitudinal adjustable movement of each link plate relative to the others causes the links as they are drawn back to closed position to closely hug the inclined or tapered surface portion of the fin as indicated in Fig. 4.

Regardless of which direction the piston moves, either one or the other finger on opposite sides of the fin will act to move the slot sealing means to closed position. This assures that the slot 12 will be closed in advance of the piston as well as in rear thereof and thus enable fluid pressure to be used to return the piston to starting position after a launching operation. Moreover, by having the slot closed ahead of the piston, dirt, moisture and other foreign matter is prevented from entering the cylinder and possibly damaging the wall surfaces of the piston and cylinder.

Also carried by the piston is a sealing provision which follows the link plate return action of each finger 48 and serves not only to prevent leakage of fluid by way of the grooves 50 but also to assure retention of the link plates in slot closing position behind the moving piston. The provision comprises a body which may be separately attached to either end of the piston beyond the extremity of the base 18 of the fin or each extremity of the fin base may be modified to provide the characteristics of the body. The provision is herein shown in Figs. 7, 8 and 9 as a separate body 52 having a key 54 which is inserted into the piston for securement. The body is mounted in alignment with the base 18 of the fin and it may be arranged to overlap a piston encircling sealing ring 56.

Each body 52 which is preferably constructed from a suitable flexible material such as spring steel or the like is stepped in exterior configuration, having a wide base portion 58 which rides in the slot 12 of the cylinder and a narrower projecting tongue-like portion 60 which rides in the grooves 50 of the link plates. The body 52 is formed with a rearwardly opening cavity indicated at 62. Preferably the cavity flares outwardly in the direction of its opening and terminates in thin, relatively flexible lips. The cavity together with the thin walled lips form a flexible cup seal on each end of the piston. The fluid pressure for propelling the piston and attached object enters the cup seal and expands the lips against the walls of the slot 12 and the grooves 50 to effectively complete the seal for the adjacent end of the piston against the escape or leakage of fluid pressure.

Obviously many modifications and variations of the present invention are possible in the light of the above teachings. It is, therefore, to be understood that within the scope of the appended claims the invention may be practiced otherwise than as specifically described.

What is claimed is:

1. In a propelling device including a cylinder having a longitudinally extending slot therein and a piston slidable in the cylinder having an arm projecting through the slot to the outside of the cylinder for operating connection to an object to be propelled, means for sealing the slot to form a closed chamber comprising a series of connected links normally positioned to close the slot, said links being deflectable laterally of the slot by engagement with the arm as the latter travels along the slot, and means carried by the piston and acting in trailing relation to the arm for returning the links to slot closing position.

2. In a propelling device, a slotted cylinder, a piston slidable in the cylinder and having an arm attached thereto extending through the slot of the cylinder to the outside thereof and serving as an operating connection between the piston and an object to be propelled, means for sealing the slot of the cylinder and yet permitting the arm to travel therealong in response to piston movement, said means comprising a chain of relatively rigid links pivotally connected together in end to end relation, said links normally positioned to close the slot to substantially seal the same but being laterally displaceable by virture of their pivotal connection to one another to permit travel of the arm along the slot.

3. The invention described in claim 2 characterized by the provision of means carried by the piston in trailing relation to the arm and operable to successively engage the links and return the same to slot closing position.

4. In a propelling device including a cylinder having a longitudinally extending slot therein and a piston slidable in the cylinder having an arm projecting through the slot to the outside of the cylinder for operating connection to an object to be propelled, means for sealing the slot to form a closed chamber, said means comprising a series of plate-like links pivotally joined to one another in end to end relation, said links normally positioned to overlie the slot and close the same but being laterally deflectable to one side of the slot by the passage of the arm along the slot.

5. The invention described in claim 4 characterized by the provision of a finger-like element carried by the piston in trailing relation to the arm and interengaging with the links, said element being operative to return each successive link to slot closing position after passage of the arm thereby.

6. In a slotted cylinder device for transferring motion from a piston to an external object, a slotted cylinder, a fluid actuated piston in the cylinder, means attached to the piston and extending through the slot of the cylinder for connection to an external object, and means to seal the slot comprising a chain of elongated sheet-like members linked together near their extremities and normally positioned along the slot to close the same, the members being laterally displaceable by said object connecting means as the latter travels along the slot in response to piston movement.

7. In a slotted cylinder device for transferring motion from a piston to an external object, a cylinder having a longitudinally extending slot, a fluid actuated piston in the cylinder, means attached to the piston and extending through the slot of the cylinder for connection to an external object, and means to seal the slot behind the piston to maintain fluid pressure, said last means comprising a chain of elongated sheet-like members pivotally linked together near their extremities and positioned along the slot to normally close the same, the members of the chain being successively laterally displaceable by said object connecting means as the latter travels along the slot in response to piston movement, and a finger-like element carried by the piston in traveling relation to said object connecting means and operatively engaging the members of the chain to return the same to slot closing position immediately after being displaced by said connecting means.

WALTER S. BAER, Sr.

References Cited in the file of this patent

UNITED STATES PATENTS

| Number | Name | Date |
| --- | --- | --- |
| 2,109,128 | Carrillo | Feb. 22, 1938 |
| 2,200,427 | Merz | May 14, 1940 |
| 2,373,455 | Carey | Apr. 10, 1945 |
| 2,603,190 | Mitchell | July 15, 1952 |